United States Patent [19]

Freundner et al.

[11] Patent Number: 5,326,933
[45] Date of Patent: Jul. 5, 1994

[54] ELECTRICAL INSTALLATION SYSTEM

[75] Inventors: Hasso Freundner, Halver; Walter Grabowski, Olpe-Biggesee, both of Fed. Rep. of Germany

[73] Assignee: Dorma GmbH+Co. KG, Ennepetal, Fed. Rep. of Germany

[21] Appl. No.: 960,508

[22] Filed: Oct. 13, 1992

Related U.S. Application Data

[63] Continuation-in-part of PCT/OE91/00267, Mar. 23, 1991

[30] Foreign Application Priority Data

Apr. 11, 1990 [DE] Fed. Rep. of Germany ....... 4011711

[51] Int. Cl.$^5$ .............................................. H02G 3/18
[52] U.S. Cl. ..................................................... 174/53
[58] Field of Search .......................................... 174/53

[56] References Cited

U.S. PATENT DOCUMENTS

| 3,609,647 | 9/1971 | Castellano | 174/53 X |
|---|---|---|---|
| 3,716,651 | 2/1973 | Werner | 174/53 |
| 3,922,478 | 11/1975 | Perkey | 174/53 |
| 4,165,443 | 8/1979 | Figart et al. | 174/53 |
| 4,336,418 | 6/1982 | Hoag | 174/53 |
| 4,918,258 | 4/1990 | Ayer | 174/53 |
| 4,924,032 | 5/1990 | Akins | 174/53 |
| 4,958,048 | 9/1990 | Bell | 174/53 |

FOREIGN PATENT DOCUMENTS

| 2338877 | 3/1975 | Fed. Rep. of Germany . |
|---|---|---|
| 2932780 | 3/1981 | Fed. Rep. of Germany . |
| 3336817 | 4/1985 | Fed. Rep. of Germany . |
| 3346493 | 7/1985 | Fed. Rep. of Germany . |
| 0232140 | 12/1987 | Fed. Rep. of Germany . |
| 3729132 | 3/1989 | Fed. Rep. of Germany . |
| 3813903 | 11/1989 | Fed. Rep. of Germany . |

Primary Examiner—Leo P. Picard
Assistant Examiner—David Tone
Attorney, Agent, or Firm—Thomas N. Ljungman

[57] ABSTRACT

An installation system for wiring of a building has at least one junction boxes connected together, with each junction box having a removable plug-in block disposed at the back thereof. The plug-in block has conductors therein with sockets for providing access to the conductors, so that essentially all of the necessary electrical connections needed for wiring the building can, by means of the sockets and corresponding plugs on the power lines and electrical accessories, be made by simply plugging together the plugs and the sockets.

19 Claims, 7 Drawing Sheets

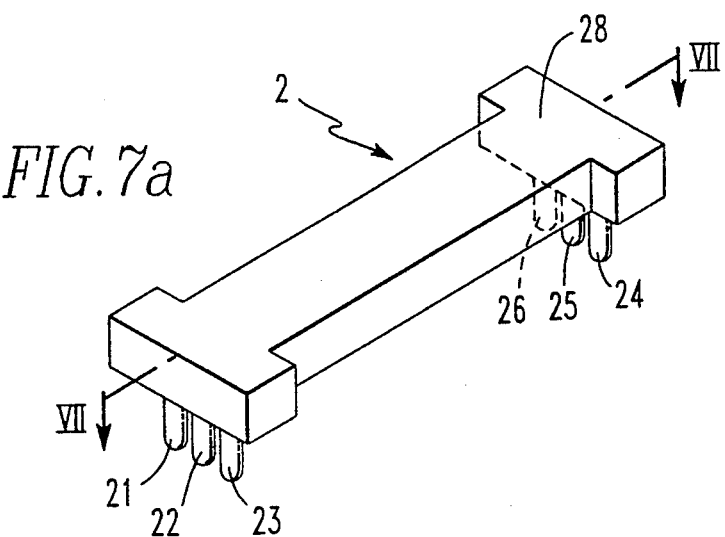
*FIG.7a*
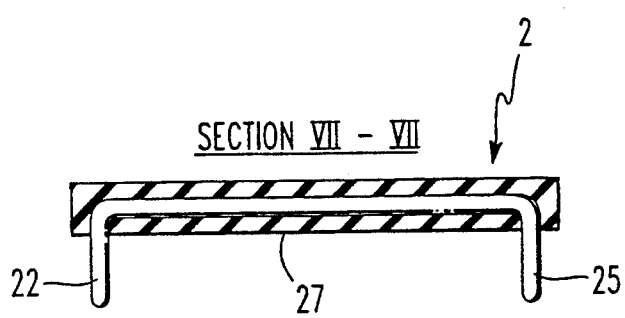
*FIG.7b*
*FIG.8a*
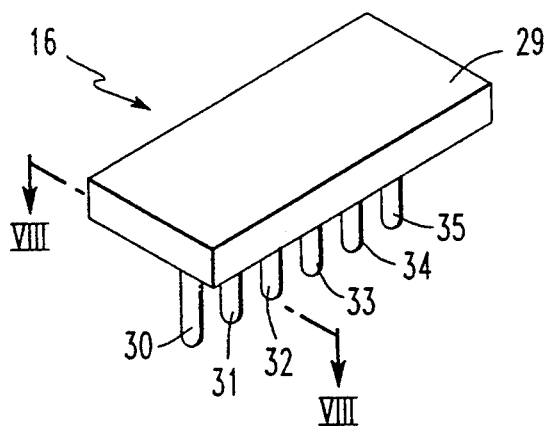
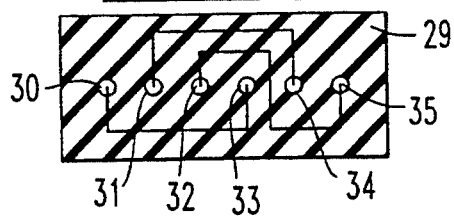
*FIG.8b*

ELECTRICAL INSTALLATION SYSTEM

CONTINUING APPLICATION DATA

This application is a continuation-in-part application of International Application No. PCT/DE91/00267, filed on Mar. 23, 1991, which claims priority from Federal Republic of Germany Patent Application No. P 40 11 711, filed on Apr. 11, 1990.

BACKGROUND OF THE INVENTION

1. Field of the Invention

This invention relates to an electrical installation system for homes or small offices for time-saving through-connections for electrical combinations of device boxes such as switch boxes, branch circuit boxes, etc. The invention is also intended to significantly simplify the connection process, i.e. the components can essentially simply be plugged in so that there is no longer any requirement for manual wiring.

2. Background Information

Previously, the wiring of a through-connection inside a box combination has been extremely time-consuming and labor-intensive. Conventional junction or device boxes such as junction boxes used as switch boxes, branch circuit boxes, etc. are designed to hold an apparatus such as a switch, dimmer, outlet, etc. wherein these devices are connected to the various power lines coming into the junction box. If more than one device is required at a given site, the corresponding number of device boxes can generally be combined to yield a junction box combination. In such junction box combinations, the device boxes holding these pieces of equipment or devices are generally equipped, by the manufacturer, with coupling elements. The coupling elements allow a mechanical combination of a number of junction boxes to be made relatively quickly on the construction site by connecting the individual device boxes to form a junction box combination. However, the wiring of the through-connection from one device or junction box to another device or junction box within a junction box combination is generally very time-consuming and labor intensive. More specifically, for the through-connection from one device box to another, at least three conductors of different lengths and different color coding, according to their electrical function, are employed on the construction site. For proper installation, the appropriate length of each conducting wire, which may vary from case to case, must be determined, and the insulation must be stripped from the ends of the wires. After preparing the lines and threading them from box to box, the wire ends which go together are connected or bonded by means of connecting clamps or wire nuts wherein the bonding can usually be done only outside of the device box. Additionally, the line ends used for connecting the electrical device must be identified, stripped of insulation on both sides, and connected using clamps. Then the entire line, with the clamps connected, must be placed back into the device box with particular care, so that the lines, conductors, cables and clamps do not interfere with the electrical device to be incorporated into the junction box. Considering a combination wherein there are five device boxes in a column, for example, it becomes clear how much time and labor are required, using the conventional installation method, to make an electrical through-connection on the construction site.

One example of an electrical device apparatus for household installation comprising a general-purpose box with connection elements and several function elements is disclosed in German Laid Open Patent Application 37 29 132. The general-purpose box disclosed therein requires no particular technical modifications when used to perform a particular function. The box further comprises a connection element which is assigned various functions, and which may be activated by means of these functions. The electrical contacts between the lines and the function element are activated by means of plug-and-socket connections containing contact points.

An additional example of an electrical device box system is disclosed in German Laid Open Patent Application 23 38 877. In this patent, conductors disposed in a raceway are fixed in their position relative to one another, wherein contact plates make the transitions to other raceways by means of joint plates. The special feature is that these contact plates are designed so that they can hold electrical devices, such as switches, receptacles and outlet boxes with terminals.

As another example, German Laid Open Patent Application 33 36 817 discloses a plug-in system for electrical devices, which can be used for electrical devices on a 220 V AC network. This system is said to significantly reduce the installation work and to prevent incorrect wiring of individual circuits. This is achieved in that the connections are made between pre-wired distributor modules and plug-in modules, which have rows of receptacles on three sides, and on another side have a row of plugs which can be connected to a row of receptacles on an incoming cable module.

An example of a low voltage electrical distribution system is disclosed in German/European Patent No. 0 232 140. This distribution system is equipped with a multi-terminal busbar and various bridging plugs between the individual electrodes.

OBJECT OF THE INVENTION

The object of the invention, for a device system of the type described above for use in homes or small offices, is to make a more efficient connection of conductors aligned in junction or device boxes arranged in a series, and in particular, a more efficient connection with the incoming feed line. The complex and time-consuming wiring inside of the device boxes of the prior art is thereby essentially eliminated, while the geometric dimensions of the device boxes, which dimensions are important for housing devices, are essentially not changed.

SUMMARY OF THE INVENTION

This object is achieved in that, in the lower portion of each device box, there is preferably at least one plug-in package or sub-unit, which can make the connection of several lines possible. This plug-in package can then be inserted into each device box of this combination, wherein the plug-in packages are thereby located so that the distance between the plug-in packages of a number of serially connected device boxes is always the same. Since this arrangement of junction boxes is essentially linear, a rapid through-connection of the wiring within this combination box can be achieved by plugging in a so-called combination jumper. The combination jumper is preferably a three-pole model, to make the electrical connections of the lines for the phase, the neutral conductor and the equipment grounding conductor.

The plug-in packages which are the subject of the application can have, for example, four possible connections per pole. The first connection can be occupied by the combination jumper as an incoming lead or cable, and the fourth connection can be occupied by another combination jumper as the relay or lead for the plug-in package in an adjoining box. In this manner, with four connection poles, two connections per pole can initially still be unoccupied. One of these unoccupied connections can then essentially be used for connection to an electrical device, and the last unoccupied connection could be used, for example, as the incoming line to a light.

Under certain circumstances, however, four possible connections per pole may not be sufficient, namely if even more outgoing cables are needed which, for example, lead to other device boxes located outside of a combination box, and which are intended to be used in the other device boxes as incoming cables. In such a case, a jumper can be used which, when plugged into a three-pole model, makes new plug-in opportunities available in an additional adjacent plug-in package. This additional plug-in package, which can preferably be located next to the first one, can also be equipped with four possible connections for each pole. Thus, by inserting a jumper from one plug-in package to another adjacent plug-in package, there can be additional possible connections for two additional outgoing leads. The increase of the possible connections from four to eight created by jumping a first plug-in package to an adjacent plug-in package could possibly be occupied as follows, for example: Position 1—Feed; Position 2—Jumper; Position 3—Device; Position 4—Relay line to the next box by means of combination jumper inside the combination; Position 5—Incoming cable for lights; Position 6—Jumper; Position 7—Relay line to an external device box; and Position 8—Relay line to an additional external device box.

Using such an installation technique, a path for the electrical through-connection inside a combination box is created and the installation effort is limited to a minimum. The jumper specified by the invention, in particular one which carries the connection of aligned conductor segments in device boxes to the supply line, makes possible in a desirable fashion a rapid electrical connection of the conductor segments to the supply line in device boxes arranged in series. By designing the jumpers for the dimensions of the device boxes and the position of the terminal contacts of the conductor segments within the boxes, the jumpers can then be inserted very easily.

In one configuration of the invention, there can be an additional jumper which crosses the conductor segments of a box, into which the connectors for initially unoccupied conductor segments in the box are embedded, with adjacent conductor segments lying on, or being connected to the feed line. This jumper can also preferably be simply and easily inserted in an appropriate layout. This type of system is somewhat more complex and thus also more capacious, although it naturally requires more space. In this version, there are essentially not just three conductors lying next to one another, but six, or seven. Of these six or seven conductors, however, only three can typically be used, and by means of a so-called jumper, the unused conductors can be activated, or connected to the power source, in addition to the conductors already connected. The result, however, is that the wiring and the connection of the devices is still preferably entirely made inside the terminal block.

In contrast to the devices of the prior art, the device according to the present invention practically represents a third generation of device boxes. In the first generation of device or junction boxes, the current distribution is made in branch circuits, which generally represent a line connection which, as a rule, utilizes loose clamps. The disadvantages of such prior art systems are apparent: additional junction boxes have to be used, and additional labor is required to connect the lines. The wiring of the clamps takes place in the box, and consequently long line ends are required, following which all the lines and cables, with the clamps, have to be stuffed back into the junction box. A great deal of work is required to straighten the line ends, and clear visibility of the wiring inside the junction boxes is essentially impossible.

In what could be termed as second generation junction boxes, current distribution is essentially carried out in so-called branch circuit boxes. Here too, the line connections are made with loose clamps which generally requires long line ends, and also requires that all the wires and cables, along with the clamps, have to be stuffed back into in the branch circuit boxes.

In contrast to the prior art, in the present invention, or third generation of junction boxes, current distribution essentially takes place in the switch boxes according to the invention. Line connections are preferably made by means of fixed plug-in packages, in which contact is made by simply inserting the ends of the lines into the plug-in packages.

The advantages of the present invention over the prior art essentially include: No more branch circuit boxes, no more branch circuit switch boxes, and no more loose clamp connections; The ability to achieve a uniformly short line length for the incoming and outgoing lines; A short, standard length connector for connecting the devices can be specified, which connector can preferably be prefabricated; There is essentially no work required to identify and assign the conductors, or to combine them and make electrical contacts among strands of different lines; There is usually no wiring inside the box, which reduces the work required to insert clamps or straighten the ends of conductors, and in particular to perform the electrical through-connection inside a combination box; A particular advantage is that no bonding, connection, or contacting of electrical connectors is made from device box to device box via installed devices; The installation system for according to the present invention, can be used anywhere, such as homes or small offices, in particular with the following various types of installation techniques: flush-type or under plaster mounting, inside drywall, concrete construction, semi-recessed or semi-flush installation, raceway, surface or exposed installation and for special types of electrical installation, e.g. ceiling-mounted systems, etc.

The devices can therefore be ready for installation, by having the devices pre-assembled, either directly in the shop or by the manufacturer, using appropriate standard lengths connectors. The installation inside a device box thereby becomes simple, apparent to visualize, and can also be rapidly modified to allow for subsequent expansion.

The electrical installation system of the present invention can be implemented using individual device boxes alone, wherein each device box holds an apparatus such as a switch or dimmer for lights, electronic doors or other electronically operated devices. However, combinations of device boxes can also preferably be made in the manner of the prior art by connecting any desired number of the individual device boxes in series. When the individual device boxes are to be connected in series, the end wall of each of the device boxes, on the coupling sides, are preferably removed to thereby permit insertion of combination jumpers from one box to the next. In such a configuration, the combination jumper essentially provides the electrical connection from one device box to another. On the bottom of each device box, there is preferably a mounting or receptacle to hold a plug-in package. Each plug-in package can preferably be three-pole or seven-pole. On the three-pole model, there is generally one pole for the phase, one for the equipment grounding conductor and one for the neutral conductor. In this version, device connections are not made inside the device box, but on the device itself. This has also become possible because on modern devices such as switches, etc., there are double contacts for the connection of lines.

If, however, a seven-pole plug-in package is used, six poles have four possible connections for lines, and the seventh pole generally has two connections and is used as an auxiliary line. Inside the plug-in package, all the connections for each pole are preferably electrically connected to one another by strip-type trunks or ducts. Three of these seven poles are specified by function for the phase, the neutral conductor and the equipment grounding conductor. The electrical feed to device boxes inside combinations can be achieved by simple insertion of prefabricated, multi-pole combination jumpers, in particular three-pole combination jumpers for the phase, the neutral conductor and the equipment grounding conductor. If the number of possible connections of a pole is insufficient for special circuits, the possible connections for each pole can be increased from four to eight possible connections by inserting a jumper. By doubling the possible connections for each pole by inserting jumpers, VDE 0606 specifies that the number of connection clamps in a device box can be cut in half.

By means of the stationary plug-in package, essentially all types of circuits of the prior art can be connected more simply than has heretofore been possible, even the more complex series/two-way circuit. The plug-in package for the installation system according to the present invention thus replaces all the conventional loose clamps inside a combination. The electrical through-connection from device box to device box inside a combination junction box is accomplished by simply plugging in the combination jumper, whereby the increase or doubling of the number of possible connections per pole can be realized simply by plugging in a jumper inside the box.

Overall, the connection technique according to the invention makes possible the fastest conceivable production of the electrical connection between conductors in device boxes connected in series, and increases the number of possible connections.

In summary, one aspect of the invention resides broadly in an electrical junction box system for a building, the junction box system for containing an electrical connection for transmitting power from an electric power line to at least one electrical device, the at least one electrical device having at least two conductors for receiving power. The electrical junction box system comprises: at least one junction box having a back portion and at least an openable front portion, the front portion defining a cavity therein, the cavity being configured for receipt of the at least one electrical device through the front portion; and a device for conducting electricity from at least a first position within the at least one junction box to a second position within the at least one junction box. The back portion of the at least one junction box comprises device for receiving and retaining the device for conducting electricity from the first position to the second position, with the device for receiving and retaining being integral with the back portion of the junction box. The device for conducting electricity is configured for being inserted into and removed from the device for receiving and retaining, and the device for conducting electricity comprising apparatus for being received by the device for receiving and retaining. The device for conducting electricity also comprises at least two separate conductors insulated from one another, and the system further comprises apparatus for slidably plugging together the at least two separate conductors with the at least two conductors of the electrical device upon insertion of the electrical device into the first portion of the at least one junction box and slidably unplugging the at least two separate conductors from the at least two conductors of the electrical device upon removal of the electrical device out of the first portion of the at least one junction box; and apparatus for fastening the at least one junction box to a structural element of a building.

Another aspect of the invention resides broadly in an electrical junction box system for a building, the junction box system for containing an electrical connection for transmitting power from an electric power line to at least one electrical device, the at least one electrical device being configured to be inserted into and removed from the junction box system, the at least one electrical device having at least two conductors for receiving power. The electrical junction box system comprises: at least two junction boxes integrally joined together at side portions thereof, each of the at least two junction boxes having a back portion and an at least openable front portion, the front portion defining a cavity therein, and the cavity being configured for receipt of the at least one electrical device; at least one of the at least two junction boxes comprising apparatus for fastening the at least two junction boxes to a structural element of a building; and each of the at least two junction boxes comprising a device for conducting electricity from at least a first position within each of the at least two junction boxes to a second position within each of the at least two junction boxes. At least one of the portions of each of the at least two junction boxes comprising a device for receiving and retaining the device for conducting electricity from the first position to the second position, with the device for receiving and retaining being integral with the back portion of the junction box. The device for conducting electricity comprises at least two separate conductors, with the at least two separate conductors being insulated from one another, and the system further comprises apparatus for connecting at least a portion of the at least two separate conductors to the at least two conductors of the electrical device; and a jumper device for being disposed across the connected side portions of the at least two junction boxes. The jumper device comprising: at least two conductors; apparatus for integrally connecting the at least two conductors of the jumper device and insulating the at least two conductors from one another; and a device for slidably plugging together the at least two conductors of the jumper device with the at least two separate conductors of a first of the at least two junction boxes and the at least two separate conductors of at least one other of the at least two junction boxes to electrically connect the at least two separate conductors of the first of the at least two junction boxes and the at least two separate conductors of the at least one other of the at least two junction boxes, and slidably unplugging the at least two conductors of the jumper device from the at least two separate conductors of the first of the at least two junction boxes and the at least two separate conductors of the at least one other of the at least two junction boxes to electrically disconnect the at least two separate conductors of the first of the at least two junction boxes from the at least two separate conductors of the at least one other of at least two junction boxes.

BRIEF DESCRIPTION OF THE DRAWINGS

The invention is explained in greater detail below, with reference to the embodiments illustrated in the accompanying drawings, in which:

FIG. 7a shows a combination jumper;

FIG. 7b show a cross section of a combination jumper;

FIG. 8a shows a jumper;

FIG. 8b show a cross section of a jumper;

DESCRIPTION OF THE PREFERRED EMBODIMENTS

Figure 1:
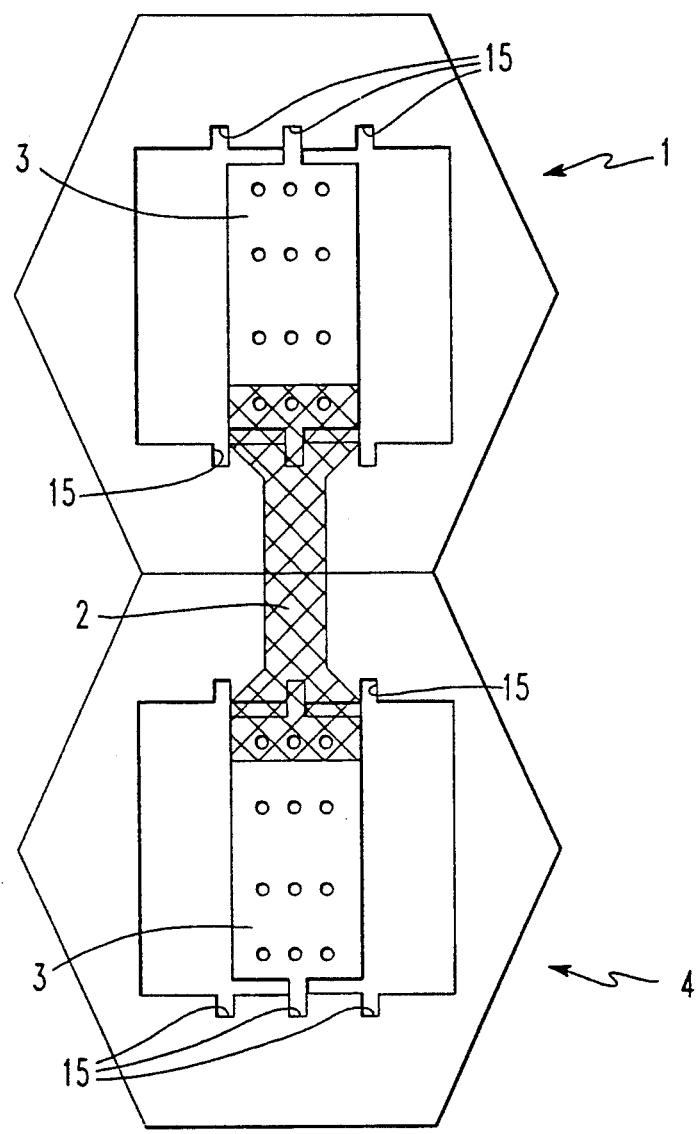
FIG. 1 shows two device boxes with a three-connector plug-in package and combination jumper.

FIG. 1 shows a plan view of a device box combination having device boxes 1 and 4. Although illustrated in FIG. 1 as having a generally hexagonal shape, a device box may be square, rectangular, or of any other known shape or kind as presently available. At the base of the device boxes 1 and 4, there is preferably a space 5 to contain the plug-in packages 3. In addition, each device box may have at least one pair of recesses or slots 15 into which a projection 9 of the packages may snap securely in place, although other fastening means may also be employed. Device boxes 1 and 4 can preferably be electrically connected together, thus forming a combination, by means of combination jumper 2, which contacts the plug-in package 3 of each device box in the combination. Device boxes 1 and 4 can be physically connected together by means well known in the art.

The combination junction box, or a single junction box can be mounted in a floor or wall of a building by means of any variety of known fastening methods. Some possible fastening methods could include driving a nail or screw through a side wall of a junction box, or possibly mounting a junction box onto a support member by means of a flange 70 (FIG. 4) which can be nailed or screwed to a wall member such as a stud (not shown), or a floor member such as a joist (not shown).

The plug-in package 3 may occupy one of various positions inside the device box. For example, in one embodiment of the present invention, there are preferably three such positions and the plug-in package 3 can be securely held within any one of these three positions.

Figure 5:
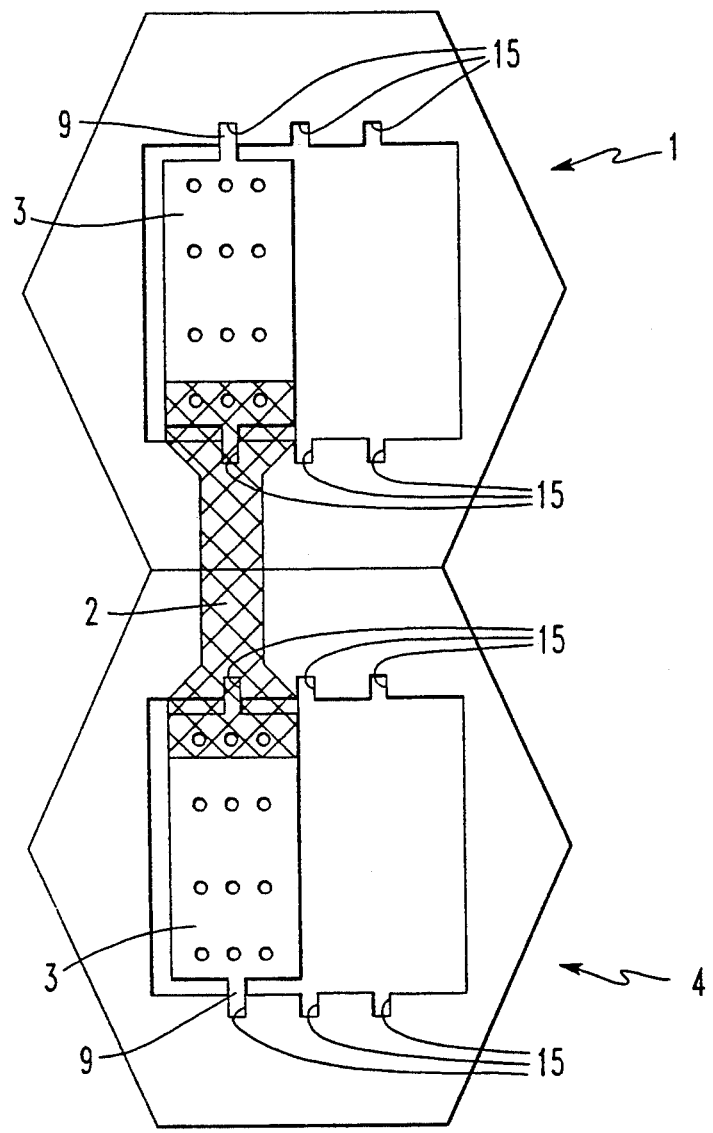
FIG. 5 shows two device boxes in a plan view with a three-connector plug-in block.
Figure 6:
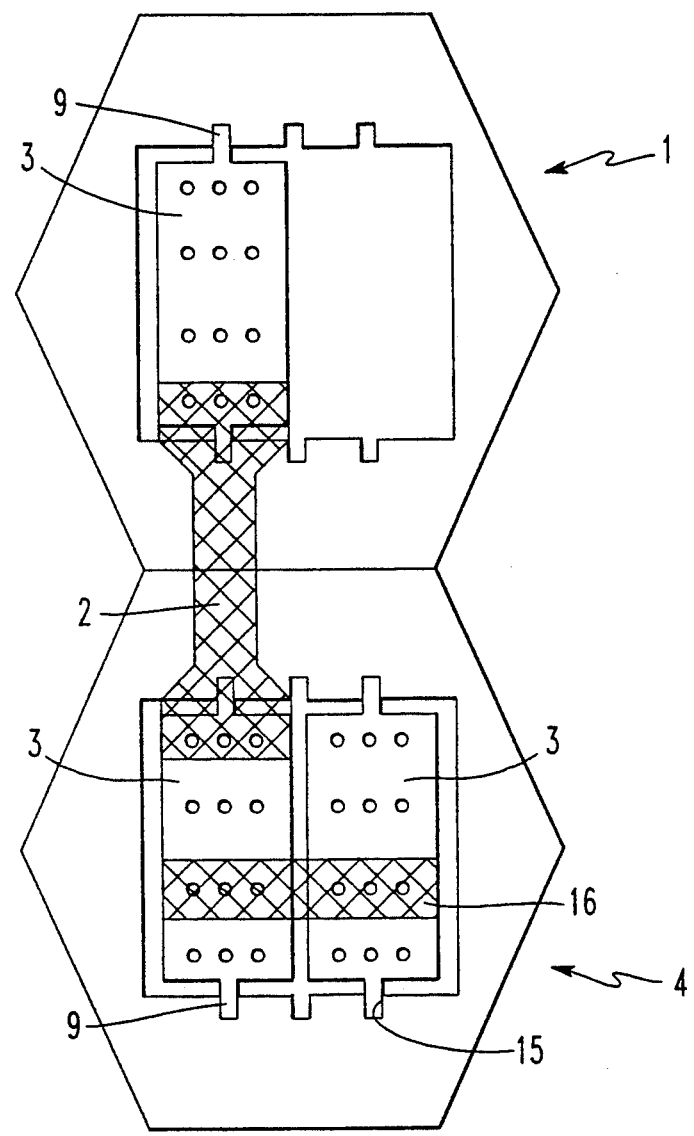
FIG. 6 shows two device boxes in a plan view with a combination jumper and a jumper.

Examples of the various positions which a plug-in package 3 may occupy within a device box are illustrated in FIGS. 1, 5 and 6. FIG. 1 shows two device boxes 1 and 4 wherein the plug-in packages 3 occupy the center position. On the other hand, FIG. 5 shows two device boxes 1 and 4 wherein the plug-in packages 3 occupy a left position. Further, as shown in FIG. 6, a plug-in package may also occupy a right position, or any one of a number of positions which may be provided within the device box. The position of the plug-in packages 3 within the device boxes is essentially fixed by means of a projections 9 preferably molded onto the ends of plug-in package 3, wherein projections 9 may be positioned in any pair of opposite recesses or slots 15 thereby securing plug-in package 3 in place.

Figure 4:
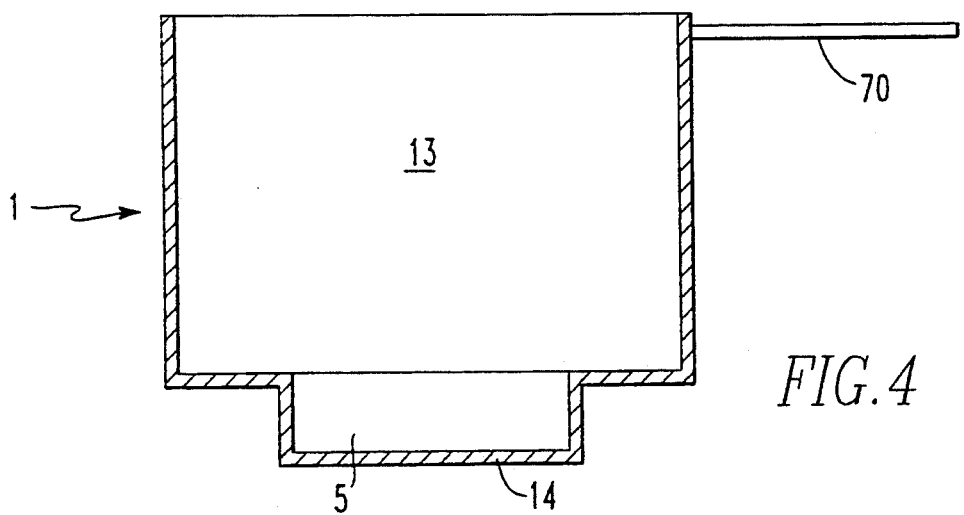
FIG. 4 shows a side view of a device box in cross section.

At the base of each device box 1, as illustrated in FIG. 4, there is preferably a receptacle or space 5 into which each plug-in package 3 can be disposed. Further, the space 5 for the plug-in package 3 is sized so that the plug-in package can be placed either on the left side, in the middle or on the right side, as discussed hereabove. As illustrated in FIG. 6, if a plug-in package 3 is inserted on the left side, a second plug-in package 3 can be introduced on the right side or visa-versa. Additionally, positioning the plug-in package 3 in space 5 simultaneously secures the plug-in package 3 in place and determines a defined distance from plug-in package 3 to the end of the device box. Thus, with a box combination comprising two device boxes, there is preferably a fixed distance between the plug-in package 3 of device box 1 and the plug-in package 3 of device box 4. The fixed distance between device boxes 1 and 4 can be jumped by a combination jumper 2, as shown in FIG. 1, wherein one end of the combination jumper 2 is engaged in the plug-in package 3 of device box 1 and the other end of combination jumper 2 is engaged in the plug-in package 3 of device box 4.

Figure 2:
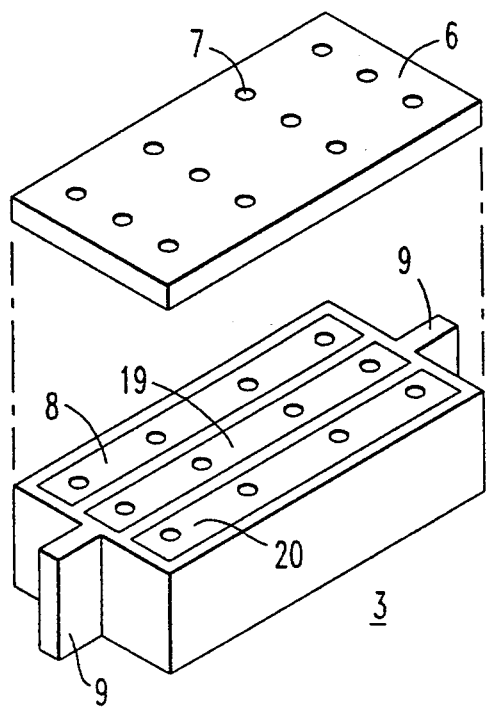
FIG. 2 shows a plug-in package with its cover removed.

In one embodiment, as illustrated in FIG. 2, the plug-in package 3 preferably comprises three conductors 8, 19 and 20 embedded in three spaces next to one another and insulated from one another. These conductors are designed so that by inserting an interconnecting wire through the cable orifice, or gland 7 of the cover 6, contact can be securely made with the line located underneath. In the cover 6, the orifices, or glands 7 are preferably arranged in line with and above one another for each conductor. Preferably, four possible connections for one conductor will suffice.

In other words, and in one embodiment as illustrated in FIG. 2, plug-in-package 3, disposed in device box 1, comprises three conductors 8, 19, and 20. Conductors 8, 19, and 20 are separated from one another by an insulating material and are preferably positioned in parallel. Additionally, conductors 8, 19, and 20 are configured so as to maintain electrical contact with the incoming lines or wires inserted through the holes 7 in cover 6.

Figure 3:
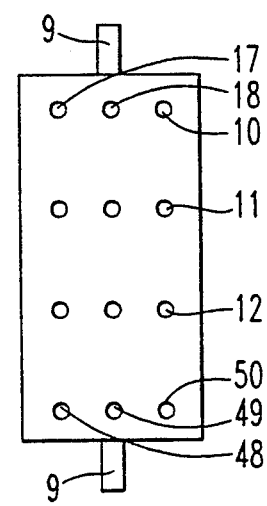
FIG. 3 shows a plug-in package as viewed from above.

The plug-in-package 3 can be supplied with power via the incoming lines, which are stripped and inserted through the holes 7 in the cover 6 thus making contact, in a manner well known in the prior art, at points 10, 17, and 18, illustrated in FIG. 3. The three incoming lines which make contact at points 10, 17, and 18 usually correspond to phase, neutral and ground currents flowing through a standard power line.

In the embodiment depicted in FIG. 3, wherein there are four connections per conductor, the following arrangement may be used. The first row, or first connection, denoted by connection points 17, 18, and 10, is for receiving incoming lines as discussed above. The second row or second connection, denoted as row 11 may be used as either an outgoing lead or as a device connection. Likewise, the third row or third connection, denoted as row 12, may also typically be used either as an outgoing lead or as a device connection. Finally, the fourth row or fourth connection, denoted by connection points 48, 49, and 50 may typically be used as a power connection to supply power to an additional device box, or if an additional device box is not being used, this fourth connection can also be used as an outgoing lead or as another device connection.

If the device box 1 is to be connected to a second device box 4, as illustrated in FIGS. 1, 5 and 6, the connection of the power supply from device box 1 to device box 4 may be made by means of a combination jumper 2. A combination jumper 2 is illustrated in greater detail in FIG. 7a. The power supply connection between two device boxes 1 and 4 may be achieved by: preferably inserting a first end of combination jumper 2 having pins 21, 22 and 23 into the fourth connection having jumper points 48, 49 and 50 of plug-in package 3 of device box 1; and at essentially the same time, inserting a second end of combination jumper 2 having pins 24, 25, and 26 into the jumper points of the first connection of the plug-in package of the subsequent device box 4. The combination jumper, as depicted in FIG. 7, can be a three-pole, or three pin model. Thus, each end of the combination jumper has three pins or poles (21, 22, 23, and 24, 25, 26) wherein one pin of each set of three corresponds to either the phase conductor, the neutral conductor or the ground conductor. Inside the combination jumper 2, illustrated in FIG. 7b, there is a continuous printed conductor 27 for each potential wherein each printed conductor is surrounded by insulation 28. Thus, in one embodiment as depicted in FIG. 7b, pin 22 of the first end of combination jumper 2 maintains electrical contact with pin 25 of the second end of combination jumper 2 via continuous printed conductor 27. Likewise, pins 21 and 26, and pins 23 and 24 maintain electrical contact preferably via continuous printed conductors (not shown), thus enabling the power supply, comprising phase, neutral and ground, to be connected from one device box to another.

Although all illustrations presented herein depict male jumpers and female plug-in packages, i.e.: the jumpers comprise pins and the plug-in packages comprise holes, the reverse configuration or a combination of configurations could also be used to make any of the electrical connections described in this application.

The embodiment illustrated in FIG. 5 shows a combination of two device boxes 1 and 4, in which the plug-in packages 3 have been inserted on the left side inside the space 5 of the device boxes. The connection between the two device boxes 1 and 4 can then preferably be accomplished by means of the combination jumper 2.

It is possible, under certain circumstances, that four possible connections per pole, as obtained from single plug-in packages 3 in each device box, may be insufficient. For example, more outgoing cables may be needed, wherein these outgoing cables lead to other device boxes located outside the combination box, and which are intended to be used there as incoming power supply lines. In such a situation, where there are insufficient contact possibilities, a second plug-in package 3 may be inserted as necessary in a second location inside the device box as shown in FIG. 6. The second plug-in package 3 can preferably be identical to the first plug-in package 3 already used for the through-connection of the power supply cable.

The second plug-in package 3 in device box 4 can be connected to a first plug-in package 3 in device box 4 by using a jumper 16 which essentially lies across both plug-in packages. The jumper 16 is preferably designed so that three through-connected conductors (phase, neutral, and ground) can be safely relayed from a first plug-in package to a neighboring plug-in package 3.

One embodiment of a jumper 16 is illustrated in FIG. 8a. In this figure, jumper 16 is shown with six contact pins (30–35) surrounded by insulation 29. Thus, the first three pins (30, 31, and 32) generally correspond to the phase, neutral, and ground conductors of the first plug-in package. Likewise, the last three pins (33, 34, and 35) generally correspond to the phase, neutral, and ground conductors of the second plug-in package, and electrical contact can be maintained between pins 30 and 33, 31 and 34, and 32 and 35 via printed conductors.

In a situation having two side-by-side plug-in packages 3, the addition of the second plug-in package provides new plug-in opportunities, as the second plug-in package is also equipped with four possible connections for each potential. Thus, by adding an additional plug-in package, eight possible connections would exist, with possible connections for at least two additional outgoing leads. The jumper 16 specified by the present invention allows for rapid electrical connection of the conductor segments to the supply line within a device box. Further, the jumper 16 is preferably of a fixed dimension which accommodates the fixed dimension of the device boxes and the position of the terminal contact of the conductor segments in the plug-in packages 3 of the device boxes, thereby enabling easy insertion of the jumper 16 into any plug-in package 3.

Figure 9:
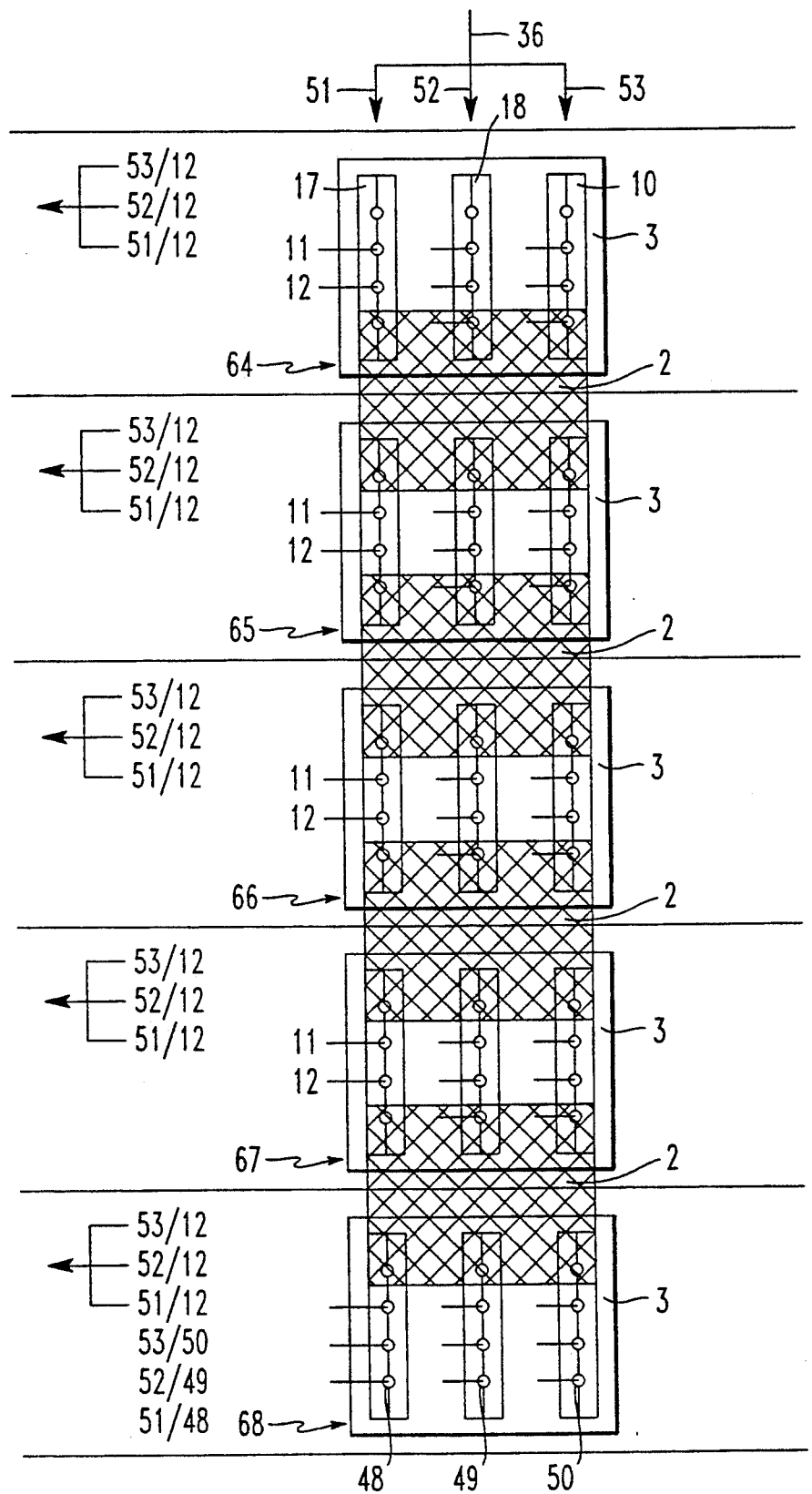
FIG. 9 shows a schematic diagram with a three-pole plug-in package.

From the embodiment illustrated in FIG. 9, which shows a combination of five device boxes, it is clear that essentially all conventional types of circuits may be realized by means of the plug-in installation system. One of several advantages of this type of installation is that there are preferably always two possible connections per potential on the switches or receptacles. Another advantage is that the number of connections made inside the plug-in system may be reduced and can preferably be made by prefabricated lines to the device.

In FIG. 9, via incoming line 36, the box 64 can be connected by the phase conductor 51, the equipment grounding conductor 52 and the neutral conductor 53 to the power supply. The device box 64 can be, for example, for a series switch plus a relay cable. Device box 64 can receive power at the first connection via plug-in connections 51/17, 52/18, and 53/10. A series switch may be wired or plugged in at the second connection, or row 11, wherein the equipment grounding conductor 52 is connected to plug-in package 3 via plug-in connection 52/11, the neutral conductor is connected to the final user via connection 53/11, and the phase is wired directly to the switch via connection 51/11. A relay cable from the third connection, or row 12, of the same device box 64 may also be accomplished via the connections 53/12, 52/12 and 51/12 through a separate cable. The fourth connection of device box 64 can preferably be occupied by combination jumper 2 for relaying the power supply to the next device box 65 of the combination box.

Device box 65 can be, for example, for a single-throw, one-way switch. The first connection of device box 65 is occupied by combination jumper 2 to receive power from the first device box of the series 64. The connection of the single-throw, one-way switch may be realized at the second connection. The phase is connected to the single-throw, one-way switch via connection 51/11, and the neutral conductor and the equipment grounding conductor are conducted directly to the final user. Additionally, a relay may be realized at the third connection of the device box 65 via the contacts 51/12, 52/12 and 53/12 of the device box 65. Similar to the first device box, the fourth connection of device box 65 can preferably be occupied by a second jumper 2 so that the feed 36 may be relayed to a third device box 66.

The device box 66 can be, for example, once again a series circuit plus a relay cable, and would therefore essentially be schematically similar to the first device box 64. Again, the contact to the subsequent device box 67 can once again be provided by means of a third combination jumper 2. The device box 67 can be, for example, for a series/two-way circuit plus a relay cable. This type of circuit can be realized using the present system, as there are typically double contacts on the devices in use today.

The final device box 68 of the combination box described above can, in turn, be electrically connected to the preceding device box 67 via a fourth combination jumper 2. Here, a receptacle can be connected on the final device box 68, and two relay cables can be introduced, which relay cables may lead, for example, to an additional installation system with appropriate device boxes. Thus, in device box 68, which does not need to have a jumper at the fourth connection, jumper points 48, 49 and 50 remain unoccupied thereby allowing, possibly, an additional connection 51/48, 52/49, 53/50, for example, for an additional relay cable to another installation system.

Figure 10:
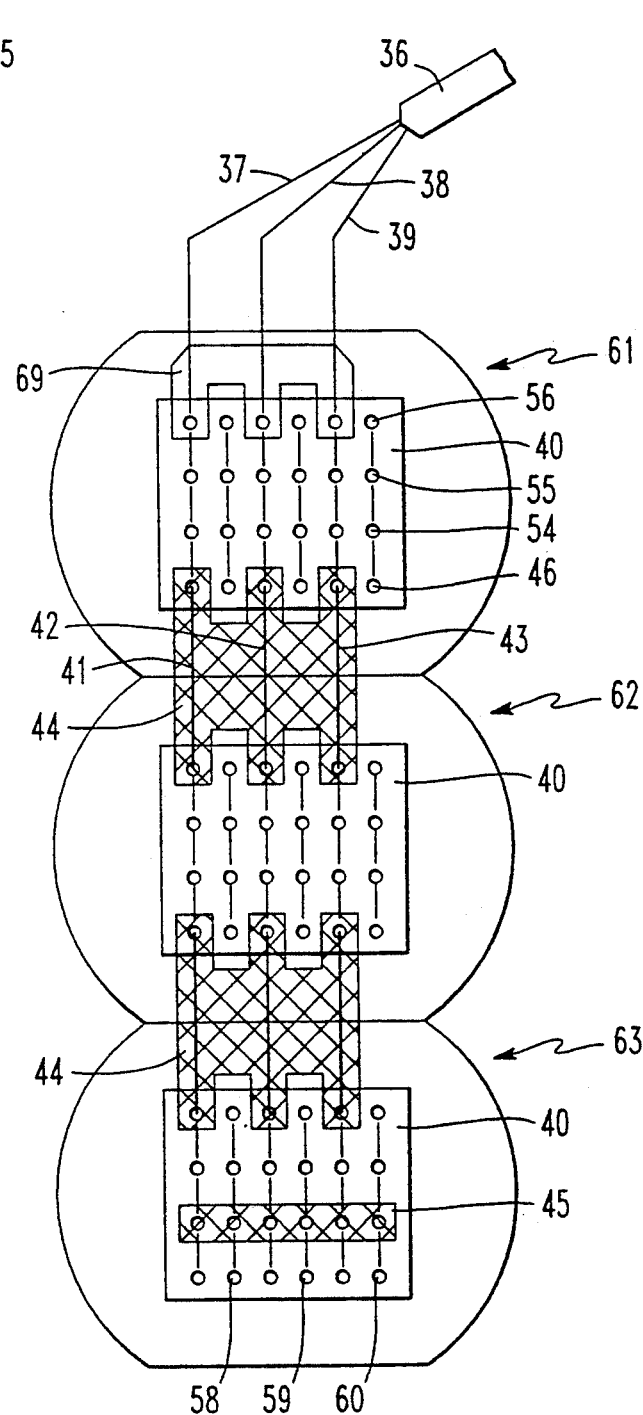
FIG. 10 shows device boxes in a plan view with a three-connector plug-in block and combination jumper.

In the embodiment of the invention illustrated in FIG. 10, each device box can have printed conductor segments 40 wherein there are preferably six parallel rows of printed conductors per device box. The illustration shows a schematic drawing of an installation system with the device boxes 61, 62, and 63. The printed conductor segments 40, each with six printed conductors running at some distance from one another are preferably printed on the base of the device boxes. Each conductor can be equipped with plug-in contacts at intervals over its length, as described above in relation to the three-pole system. In the illustrated case, there can be four plug-in contacts per conductor segment. For example, the last or sixth conductor segment of device box 61 has the plug-in contacts 46, 54, 55 and 56.

The feed line 36 with its lines 37, 38 and 39 can be connected to the printed conductor segment 40 of the device box 61, preferably by means of the terminal plug-in contacts of the conductors 37, 38 and 39. Such contact may be made easily by way of a plug 69 as illustrated in FIG. 10. The connection can be made in the manner of the prior art by inserting the stripped ends of the lines 37, 38 and 39 through the wall of the box into the plug-in contacts of the corresponding printed conductor segments 40.

Figure 12:
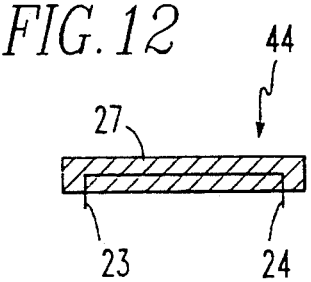
FIG. 12 shows a cross section of the combination jumper of FIG. 10.

For the connection of aligned conductors in device boxes arranged in series, e.g. 62 and 63, combination jumpers 44 may be used. A cross section of a combination jumper 44 is illustrated in FIG. 12 wherein conductors 27 can preferably be embedded in the combination jumper, and plug contacts, such as 23 and 24 which are illustrated, can project from the jumper in the terminal regions of the combination jumper 44. Further, when the combination jumper 44 is inserted, a plug-in contact is introduced into the phase conductor 37, ground conductor 38, and neutral conductor 39 of the printed conductor segments 40 of the first device box 61. Combination jumper 44 then relays the phase, ground, and neutral via conductors 41, 42, and 43, respectively, to the second device box 62, where contact is made with the printed conductor segments 40 of device box 62 via the terminal plug contacts of these conductors.

Although plug-in contacts provide the fastest and easiest installation of the system of the present invention, it is also possible, if a more rigid installation is desired, for the electrical contacts to be made permanent after plugging the connections together, by means such as soldering. In such an embodiment, the feed line connections may possibly be soldered to the contact points of the first device box, and likewise, it is possible for the combination jumpers 44 to be soldered to two device boxes thereby providing for permanent electrical connection.

In one possible embodiment of the invention, illustrated in FIG. 10, there can be an additional jumper 45 which crosses the conductor segments of a device box 63, into which the connectors for initially unoccupied conductor segments in the box are embedded, with adjacent conductor segments lying on or connected to the feed line. This jumper 45 can be simply and easily inserted in an appropriate layout. This type of system is somewhat more complex and thus naturally requires more space.

In this version, depicted in FIG. 10, there are not only three conductors lying next to one another, but six, or possibly even seven. Of these six or seven conductors, generally, only three are used. However, by means of a jumper 45 to supply power, the unused conductors may be activated in addition to the conductors already connected to the power supply.

Figure 11:
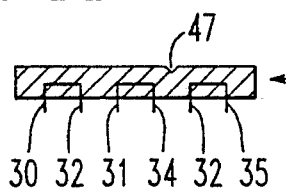
FIG. 11 shows a cross section of the separable jumper of FIG. 10.

More particularly, note the three device box series (61, 62, and 63) illustrated in FIG. 10. Each device box in this series has six columns of conductor segments. In each of these device boxes, the first, third, and fifth conductor segments are supplied with power. In order to distribute power to and thus activate the second, fourth, and sixth columns or conductor segments, jumper 45, illustrated in FIG. 11 and in device box 63, may be employed. Thus, by plugging in jumper 45, all six conductor segments of device box 63 can be supplied with power. For example, by plugging in jumper 45 in device box 63, an additional device, such as a dimmer, can be plugged in at contact points 58, 59, and 60.

Therefore, in device box 63, there may be two conductor segments per potential with four connection sites per conductor segment thus yielding eight possible connections per potential. A further result is that both the wiring and the connection of the devices are made inside the terminal block.

In the event that a seven pole, or seven conductor segment device box (not shown) is used, six of the conductor segments, as described above, will preferably have four connections per conductor segment. However, the seventh pole or conductor segment may be used as an auxiliary line and may have two or any number of possible connections. If it is desirable to have additional connections of only one or possibly two conductors, the jumper 45 can be broken off at a notch 47. Thus, jumper 45 may be used for connecting one, two, or all three conductors. Further, a device box may possibly have any number of conductor segments and any number of possible connections per conductor segment, and consequently, combination jumpers 44 and jumpers 45 may be designed to accommodate the dimensions of these components.

Therefore, in the present invention, at least two plug-in contacts per conductor per device box remain available for the connection of the devices to be inserted in the device box, and also for the connection of branch circuits. To prevent improper connections of conductors, there are preferably reference marks on the printed conductor segments and also on the combination jumpers or jumpers.

With the plug-in package described above, which may consist of six or even seven printed conductor segments, a connection of the devices to be installed inside the plug-in module can be made with a minimum of effort and skill. More specifically, the device, such as a switch or dimmer, positioned in space 13 of the device box, may comprise pins extending therefrom and thereby enable the device to be directly plugged into the plug-in package 3 positioned in space 5 of the device box.

Although a wiring connection is possible, a plug-in pin connection provides faster and more convenient installation. For this reason, the devices contained within the device box, i.e. switches, dimmers, and the like, are preferably manufactured with connecting pins similar to those employed in jumpers and combination jumpers. Further, the devices are preferably manufactured such that their dimensions and connection pin arrangements accommodate the plug-in package 3 to which they are connected.

Additionally, it is probable that a device may comprise both connection pins and wires thus enabling the device, such as a light switch, to be plugged into the plug-in package via the connection pins, and then wired to an apparatus, such as a light, outside the device box.

By using the installation system of the present invention, switching and control devices, such as light switches, dimmers or electronic door switches, can be directly connected in each device box of a combination. It is also possible, however, to feed additional device boxes by means of a relay cable such as an outgoing cable. Further, in the present invention, when feeding the individual device boxes inside a combination, no additional wiring work needs to be performed on the construction site. The conventional clamps, which are generally inserted loose, are thus no longer needed. The above-referenced device boxes are not only device boxes or device connection boxes but, if necessary, they can be installed purely as connection boxes.

One feature of the invention resides broadly in an electrical installation system, consisting of device boxes which can be arranged in a series to hold devices such as switches, receptacles, etc., with a number of conductors in the base of the device boxes, running next to one another at some distance from one another and having a number of plug-in contacts located at intervals over their length, which conductors are embedded in an insulating block, whereby contacts and/or switched lines on the input side of at least one of the terminal device boxes of the system are connected to the strands of the power supply line fed through a passage in the box wall, and to the adjacent contacts of subsequent installation boxes by connections for aligned conductors in device boxes in series through passages in the box walls, and the remaining contacts are available for the connection of the devices and branch circuit lines, characterized by the fact that in the lower portion of the device box 1, 4, and 61–68 there is at least one space 5 for a replaceable plug-in package 3 which can be fixed in its position or a printed conductor segment 40 with several possible connections per pole, and the connections at least for the aligned conductors to be connected to the feed line are embedded in jumpers extending through the box walls of device boxes connected in a series, from which, on the terminal side oriented toward the conductors, plugs project from the connections, from the ends toward the conductors, and are inserted in the terminal plug-in contacts of the conductors.

Another feature of the invention resides broadly in an electrical installation system, characterized by the fact that the connections between the individual device boxes 1, 4, and 61–68 are prefabricated combination jumpers 2 or 44.

Another feature of the invention resides broadly in an electrical installation system, characterized by the fact that the connections 27 embedded in the combination jumpers 2 or 44 are conductors, whose bent ends, projecting out of the combination jumper 2, form the plugs 21, 22, 23, 24, 25, 26, 30, 31, 32, 33, 34 and 35.

Yet another feature of the invention resides broadly in an electrical installation system, characterized by the fact that the plug-in package 3 is equipped with three printed conductors 27 electrically insulated from one another, which run parallel and can be connected by means of a plug-type connection.

Still another feature of the invention resides broadly in an electrical installation system, characterized by the fact that the cover 6 of the plug-in package 3 has at least three cable glands 7 for each conductor.

Another feature of the invention resides broadly in an electrical installation system, characterized by the fact that there is at least one stationary location for the plug-in package 3 in the device box 1, 4, and 61–68.

Yet another feature of the invention resides broadly in an electrical installation system, characterized by the fact that two plug-in packages 3 or printed circuit segments 40 are connected to one another by means of jumpers 16 and 45.

Another feature of the invention resides broadly in an electrical installation system, characterized by the fact that the plug-in package 3 or the printed circuit segment 40 is equipped with more than three printed conductors 27 electrically insulated from one another, which run parallel.

Still another feature of the invention resides broadly in an electrical installation system, characterized by a combination jumper 44 with a compact connection arrangement which connects the conductors adjacent to the conductors connected to the feed line.

Another feature of the invention resides broadly in an electrical installation system, characterized by a second jumper 45, crossing the conductors of a device box 61–68, with the contact bridges 30, 31, 32, 33, 34 and 35 embedded therein to short circuit the conductors 37, 38 and 39 connected to the feed line with the neighboring unoccupied conductors.

Yet another feature of the invention resides broadly in an electrical installation system, characterized by the fact that the jumper 45 is equipped with notches 47 to indicate the points at which it can be broken off.

Another feature of the invention resides broadly in an electrical installation system, characterized by the fact that the device box is used without a device connection as a branch circuit box.

Examples of electric boxes which may be used in conjunction with the embodiments of the present invention may be found in U.S. Pat. No. 4,211,464, entitled "Electrical outlet box containing twin electric sockets"; and U.S. Pat. No. 4,035,052, entitled "Quick connector electrical utility box."

All, or substantially all, of the components and methods of the various embodiments may be used with at least one embodiment or all of the embodiments, if any, described herein.

All of the patents, patent applications and publications recited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. An electrical junction box system for a building, the junction box system for containing an electrical connection for transmitting power from an electric power line to at least one electrical device, the at least one electrical device having at least two conductors for receiving power, said electrical junction box system comprising:

at least one junction box, said at least one junction box having aback portion and at least an openable front portion, the front portion defining a cavity therein, the cavity being configured for receipt of the at least one electrical device through said front portion;

means for conducting electricity from at least a first position within said at least one junction box to a second position within said at least one junction box;

said back portion of said at least one junction box comprising means for receiving and retaining said means for conducting electricity, said means for receiving and retaining being integral with said back portion of said junction box;

said means for conducting electricity being configured for being inserted into and removed from said means for receiving and retaining;

said means for conducting electricity comprising means for being received by said means for receiving and retaining;

said means for conducting electricity comprising at least two separate conductors, said at least two separate conductors being insulated from one another;

means for slidably plugging together said at least two separate conductors of said means for conducting electricity with said at least two conductors of said electrical device upon insertion of said electrical device into said first portion of said at least one junction box and slidably unplugging said at least two separate conductors from said at least two conductors of said electrical device upon removal of said electrical device out of said first portion of said at least one junction box;

means for fastening said at least one junction box to a structural element of a building;

said means for receiving and retaining comprises means for positioning said means for conducting in at least three stationary positions within the at least one junction box;

said means for positioning comprise slot means; and said means for being received of said means for conducting comprise projections configured to substantially correspond to said slot means.

2. The system according to claim 1, wherein:

said power line comprises at least two conductors;

said at least two conductors of the power line comprising plug means;

said at least two conductors of said electrical device comprise plug means; and said means for plugging and unplugging comprises:

a plurality of socket means disposed along each of said at least two conductors of said means for conducting; and said plug means of said electrical device, wherein each of said plug means of said electrical device is for being plugged into one socket of said plurality of sockets along each of said at least two conductors to thereby electrical connect said electrical device to said means for conducting upon insertion of said electrical device into said at least one junction box; and said plug means of said at least two conductors of said power line are for being inserted into additional sockets of said plurality of sockets to provide electrical power to said at least two conductors.

3. The system according to claim 2, wherein:

said at least two conductors of said power line, said means for conducting and said electrical device comprise at least three conductors for individually carrying one of: phase, neutral and ground current.

4. The system according to claim 3, wherein:

said system further comprises at least one additional means for conducting electricity, said at least one additional means for conducting comprising:

at least three conductors for individually carrying one of: phase, neutral and ground current; and a plurality of sockets corresponding to each of said at least three conductors;

said back portion of said at least one junction box comprises means for receiving and retaining said at least one additional means for conducting;

said means for receiving and retaining comprising a recessed portion in said back portion of said junction box; and said system further includes first jumper means for being disposed to electrically connect said at least three conductors of said means for conducting to said at least three conductors of said at least one additional means for conducting, said first jumper means comprising:

at least three conductors, each of said at least three conductors having a first end and a second end;

means for integrally connecting said at least three conductors as an integral unit; and said first end of said at least three conductors comprising a first set of plug means for being plugged into sockets of said means for conducting and said second end of said at least three conductors comprising a second set of plug means for being plugged into sockets of said additional means for conducting to electrically connect said at least three separate conductors of said at least one additional means for conducting to said at least three conductors of said means for conducting.

5. The system according to claim 4, wherein:
said at least three conductors of both of said means for conducting and said additional means for conducting are disposed parallel to one another; and
said three parallel conductors of said means for conducting are for being disposed parallel to said three parallel conductors of said at least one additional means for conducting.

6. The system according to claim 5, wherein:
said at least three conductors of said means for conducting and said at least three conductors of said additional means for conducting comprising a parallel arrangement of six conductors;
said at least three conductors of said means for conducting comprising a first conductor, a second conductor and a third conductor of said parallel arrangement;
said at least three conductors of said additional means for conducting comprising a fourth conductor, a fifth conductor and a sixth conductor of said parallel arrangement;
said first jumper means comprises an integral linear arrangement of said first set of plugs and said second set of plugs;
said first set of plugs comprising a first plug, a second plug and a third plug of said linear arrangement;
said second set of plugs comprising a fourth plug, a fifth plug and a sixth plug of said linear arrangement; and
said first plug being connected to said fourth plug, said second plug being connected to said fifth plug and said third plug being connected to said sixth plug to thereby connect said first conductor to said fourth conductor, said second conductor to said fifth conductor and said third conductor to said sixth conductor upon insertion of said plug means of said first jumper means into said sockets of said means for conducting and said additional means for conducting.

7. The system according to claim 6, wherein:
said at least three conductors of said means for conducting and said at least three conductors of said additional means for conducting comprising a parallel arrangement of six conductors;
said at least three conductors of said means for conducting comprising a first conductor, a third conductor and a fifth conductor of said parallel arrangement;
said at least three conductors of said additional means for conducting comprising a second conductor, a fourth conductor and a sixth conductor of said parallel arrangement;
said first jumper means comprises an integral linear arrangement of said first set of plugs and said second set of plugs;
said first set of plugs comprising a first plug, a third plug and a fifth plug of said linear arrangement;
said second set of plugs comprising a second plug, a fourth plug and a sixth plug of said linear arrangement; and
said first plug being connected to said second plug, said third plug being connected to said fourth plug and said fifth plug being connected to said sixth plug to thereby connect said first conductor to said second conductor, said third conductor to said fourth conductor and said fifth conductor to said sixth conductor upon insertion of said plug means of said first jumper means into said sockets of said means for conducting and said additional means for conducting.

8. The system according to claim 7, wherein:
said first jumper comprises at least one notch thereon;
said at least one notch being located between one of:
said second and third plugs; and
said fourth and fifth plugs;
said jumper being breakable at said at least one notch to provide at least two shortened jumpers having one of the following configuration combinations:
a) said first and second plugs; and
said third, fourth, fifth and sixth plugs;
b) said fifth and sixth plugs; and
said first, second, third, and fourth plugs; and
c) said first and second plugs;
said third and fourth plugs; and
said fifth and sixth plugs.

9. The system according to claim 6, wherein:
said at least one junction box comprises at least a first and a second junction box;
at least one of said at least a first and a second junction box comprising means for connecting at least two of said junction boxes together;
said at least a first and a second junction boxes being integrally connected to one another at side portions thereof by means of said means for connecting;
each of said at least a first and a second junction boxes comprising at least one of said means for conducting electricity; and
said system further comprises second jumper means for being disposed across said connected side portions of said at least a first and a second junction boxes, said second jumper means comprising:
at least three conductors for carrying the phase, neutral and ground currents;
means for integrally connecting said at least three conductors of said jumper means to form a single integral jumper piece and insulating said at least three conductors from one another;
a third set of plug means for being plugged into and unplugged from sockets of said means for conducting of said first junction box and a fourth set of plug means for being plugged into and unplugged from said socket means of said means for conducting of said second junction box;

said third set of plug means being connected to said fourth set of plug means by said at least three conductors of said second jumper means to electrically connect and disconnect said three separate conductors of said means for conducting of said first junction box to said three conductors of said means for conducting of said second junction box upon said plugs of said second jumper means being plugged into and unplugged from said means for conducting of said first and second junction boxes.

10. An electrical junction box system for a building, the junction box system for containing an electrical connection for transmitting power from an electric power line to at least one electrical device, the at least one electrical device being configured to be inserted into and removed from the junction box system, the at least one electrical device having at least two conductors for receiving power, said electrical junction box system comprising:

at least two junction boxes integrally joined together at side portions thereof, each of said at least two junction boxes having a back portion and an at least openable front portion, the front portion defining a cavity therein, the cavity being configured for receipt of the at least one electrical device;

at least one of said at least two junction boxes comprising means for fastening said at least two junction boxes to a structural element of a building;

each of said at least two junction boxes comprising means for conducting electricity from at least a first position within each of said at least two junction boxes to a second position within each of said at least two junction boxes;

at least one of said portions of each of said at least two junction boxes comprising means for receiving and retaining said means for conducting electricity, said means for receiving and retaining being integral with said back portion of said junction box;

said means for conducting electricity comprising at least two separate conductors, said at least two separate conductors being insulated from one another;

means for connecting at least a portion of said at least two separate conductors of said means for conducting to said at least two conductors of said electrical device; and jumper means for being disposed across said connected side portions of said at least two junction boxes, said jumper means comprising:

at least two conductors;

means for integrally connecting said at least two conductors of said jumper means and insulating said at least two conductors from one another; and means for slidably plugging together said at least two conductors of said jumper means with said at least two separate conductors of a first of said at least two junction boxes and said at least two separate conductors of at least one other of said at least two junction boxes to electrically connect said at least two separate conductors of said first of said at least two junction boxes and said at least two separate conductors of said at least one other of said at least two junction boxes, and slidably unplugging said at least two conductors of said jumper means from said at least two separate conductors of said first of said at least two junction boxes and said at least two separate conductors of said at least one other of said at least two junction boxes to electrically disconnect said at least two separate conductors of said first of said at least two junction boxes from said at least two separate conductors of said at least one other of said at least two junction boxes.

11. The system according to claim 10, wherein:

the at least two conductors of the jumper means have a first end and a second end;

each of said first end and said second end of each of the at least two conductors of said jumper means comprising plug means;

said means for conducting of each of said junction boxes comprise a plurality of socket means therein corresponding to each of said at least two conductors of each means for conducting;

said plug means of said first end of said at least two conductors of said jumper means for being inserted into socket means of said means for conducting of a first junction box to electrically connect the at least two conductors of the jumper means with the at least two conductors of said means for conducting of the first junction box; and said plug means of said second end of said at least two conductors of said jumper means for being inserted into socket means of means for conducting of a second junction box to electrically connect the at least two conductors of the jumper means with the at least two conductors of the means for conducting of the second junction box.

12. The system according to claim 11, wherein said means for conducting comprises:

a first portion, said first portion comprising said at least two conductors; and a second portion, said second portion comprising a cover, said cover comprising said a plurality of holes therethrough;

said cover being disposed over said at least two conductors wherein said holes define said socket means for receiving said plug means; and fastening means to secure said at least one plug-in package in said at least one junction box.

13. The system according to claim 12, wherein:

said means for receiving and retaining comprises:

a recessed portion in the back portion of each of said at least two junction boxes, said recessed portion being configured to hold at least two of said means for conducting;

means for positioning said means for conducting in one of at least three positions within said recessed portion, said means for positioning comprising at least three pairs of slot means, at each of a first side and a second side of the recessed portion, said second side being opposite said first side; and said means for conducting is configured for being inserted into and removed from said recessed portion; and said means for conducting comprises projections for being inserted into said slot means to position said means for conducting in said recessed portion in one of said at least three positions.

14. The system according to claim 13, wherein:

said power line comprises at least two conductors;

said at least two conductors of said power line having an end for being disposed in one of said at least two junction boxes; and said end of each of said at least two conductors of said power line for being plugged into corresponding sockets of said means for conducting of said one of said at least two junction boxes to provide electrical power to said at least two conductors of said one of said at least two junction boxes.

15. The system according to claim 14, wherein:

said at least two conductors of said means for conducting are disposed parallel to and spaced apart from one another;

said cover means comprises at least one row of said holes therethrough corresponding to each of said at least two conductors; and each of said rows of holes comprising at least four holes to provide at least four sockets for each of said at least two conductors.

16. The system according to claim 15, wherein:

at least one of said at least two junction boxes further comprises at least one additional means for conducting electricity;

said at least one additional means for conducting for being disposed adjacent said means for conducting in said recess of said at least one junction box; and said system further includes second jumper means for being disposed to electrically connect said at least two conductors of said means for conducting to said at least two conductors of said at least one additional means for conducting, said second jumper means comprising:

at least two conductors, each of said at least two conductors having a first end and a second end;

means for integrally connecting said at least two conductors as an integral unit; and said first end of said at least two conductors comprising a first set of plug means for being plugged into sockets of said means for conducting and said second end of said at least two conductors comprising a second set of plug means for being plugged into sockets of said additional means for conducting to electrically connect said at least two separate conductors of said at least one additional means for conducting to said at least two conductors of said means for conducting.

17. The system according to claim 16, wherein:

said at least two conductors of each of said means for conducting and said additional means for conducting are disposed parallel to one another; and said two parallel conductors of said means for conducting are for being disposed parallel to said two parallel conductors of said at least one additional means for conducting.

18. The system according to claim 17, wherein:

said at least two conductors of said means for conducting, said additional means for conducting, said electrical device, said jumper means, said second jumper means, and said power line comprise at least three conductors;

a first of said at least three conductors for carrying phase current, a second of said at least three conductors for carrying neutral current, and a third of said at least three conductors comprising a ground;

said at least three conductors of said means for conducting and said at least three conductors of said additional means for conducting comprise a parallel arrangement of six conductors;

said at least three conductors of said means for conducting comprising a first conductor, a second conductor and a third conductor of said parallel arrangement;

said at least three conductors of said additional means for conducting comprising a fourth conductor, a fifth conductor and a sixth conductor of said parallel arrangement;

said second jumper means comprises an integral linear arrangement of said first set of plugs and said second set of plugs;

said first set of plugs comprising a first plug, a second plug and a third plug of said linear arrangement;

said second set of plugs comprising a fourth plug, a fifth plug and a sixth plug of said linear arrangement; and said first plug being connected to said fourth plug, said second plug being connected to said fifth plug and said third plug being connected to said sixth plug to thereby connect said first conductor to said fourth conductor, said second conductor to said fifth conductor and said third conductor to said sixth conductor upon insertion of said plug means of said jumper means into said sockets of said means for conducting and said additional means for conducting.

19. The system according to claim 17, wherein:

said at least two conductors of said means for conducting, said additional means for conducting, said electrical device, said jumper means, said second jumper means, and said power line comprise at least three conductors;

a first of said at least three conductors for carrying phase current, a second of said at least three conductors for carrying neutral current, and a third of said at least three conductors comprising a ground;

said at least three conductors of said means for conducting and said at least three conductors of said additional means for conducting comprising a parallel arrangement of six conductors;

said at least three conductors of said means for conducting comprising a first conductor, a third conductor and a fifth conductor of said parallel arrangement;

said at least three conductors of said additional means for conducting comprising a second conductor, a fourth conductor and a sixth conductor of said parallel arrangement;

said second jumper means comprises an integral linear arrangement of said first set of plugs and said second set of plugs;

said first set of plugs comprising a first plug, a third plug and a fifth plug of said linear arrangement;

said second set of plugs comprising a second plug, a fourth plug and a sixth plug of said linear arrangement;

said first plug being connected to said second plug, said third plug being connected to said fourth plug and said fifth plug being connected to said sixth plug to thereby connect said first conductor to said second conductor, said third conductor to said fourth conductor and said fifth conductor to said sixth conductor upon insertion of said plug means of said jumper means into said sockets of said means for conducting and said additional means for conducting; and said second jumper means comprises at least one notch thereon;

said at least one notch being located between one of:
  said second and third plugs; and
  said fourth and fifth plugs;
said second jumper means being breakable at said at least one notch to provide at least two shortened jumpers having one of the following configuration combinations:

a) said first and second plugs; and
  said third, fourth, fifth and sixth plugs;
b) said fifth and sixth plugs; and
  said first, second, third, and fourth plugs; and
c) said first and second plugs;
  said third and fourth plugs; and
  said fifth and sixth plugs.

* * * * *

UNITED STATES PATENT AND TRADEMARK OFFICE
CERTIFICATE OF CORRECTION

PATENT NO. : 5,326,933
DATED : July 5, 1994
INVENTOR(S) : Hasso FREUNDNER and Walter GRABOWSKI It is certified that error appears in the above-indentified patent and that said Letters Patent is hereby corrected as shown below:

On the title page, item [63], after 'of' delete "PCT/OE91/00267" and insert --PCT/DE91/00267--.

In column 15, line 58, Claim 1, after 'having' delete "aback" and insert --a back--.

Signed and Sealed this

Third Day of September, 1996

Attest:

BRUCE LEHMAN

Attesting Officer

Commissioner of Patents and Trademarks